United States Patent [19]
Ford

[11] 3,945,350
[45] Mar. 23, 1976

[54] FUEL INJECTION SYSTEMS FOR INTERNAL COMBUSTION ENGINES

[75] Inventor: Eric Harold Ford, London, England

[73] Assignee: Lumenition Limited, England

[22] Filed: Jan. 30, 1974

[21] Appl. No.: 438,178

Related U.S. Application Data

[62] Division of Ser. No. 321,660, Jan. 8, 1973.

[30] Foreign Application Priority Data
Jan. 18, 1972 United Kingdom.............. 2311/72

[52] U.S. Cl........................ 123/32 EA; 123/119 R
[51] Int. Cl.² ........................................ F02B 3/00
[58] Field of Search........ 123/32 EA, 148 E, 117 R

[56] References Cited
UNITED STATES PATENTS

| | | | |
|---|---|---|---|
| 3,682,152 | 8/1972 | Muller-Berner............ | 123/32 EA |
| 3,696,303 | 10/1972 | Hartig......................... | 123/148 E |
| 3,738,339 | 6/1973 | Huntzinger................. | 123/117 R |
| 3,780,711 | 12/1973 | Lindberg.................... | 123/32 EA |
| 3,810,448 | 5/1974 | Ford........................... | 123/32 EA |
| 3,831,563 | 8/1974 | Brittain...................... | 123/32 EA |

Primary Examiner—Charles J. Myhre
Assistant Examiner—Ronald B. Cox
Attorney, Agent, or Firm—Larson, Taylor and Hinds

[57] ABSTRACT

The quantity of fuel injected in a fuel injection system of an internal combustion engine is achieved electronically by generating two series of pulses in synchronism with the engine using one series as a reference for maximum advance and the other series to operate a counter to count down the requisite number of pulses beyond the maximum advance point before the fuel injection is initiated, the count of the counter being varied from a computer in accordance with speed and/or load on the engine.

11 Claims, 4 Drawing Figures

FUEL INJECTION SYSTEMS FOR INTERNAL COMBUSTION ENGINES

RELATED APPLICATION

This application relating to fuel injection systems has been divided out of application Ser. No. 321,660, now pending filed Jan. 8, 1973 relating to the advance and retard of the spark ignition in an ignition system of an internal combustion engine.

FIELD OF THE INVENTION

The present invention relates to fuel injection systems for internal combustion engines.

PRIOR ART

One such fuel injection system is disclosed in my application Ser. No. 874,470 now U.S. Pat. No. 3,851,628 and a continuation-in-part application Ser. No. 202,979 now U.S. Pat. No. 3,810,448. Both systems disclosed in these two applications utilize the principle of fast inverse switching a signal produced by a beam of infra-red radiation which is chopped in synchronism with the engine revolutions. The amount of fuel injected was achieved by utilizing the vacuum principle in accordance with speed or load. All the known methods of achieving accurate control of the quantity of fuel injected relied on mechanical devices such as spring biased diaphragms, and whilst perfectly satisfactory they are liable to failure or misadjustment.

SUMMARY OF THE INVENTION

It is therefore an object of the present invention to utilize an electronic system for the control of the quantity of fuel injected in an internal combustion engine in accordance with speed and/or load, whereby the fuel injection system is substantially free from mechanical defects.

According to the present invention there is provided an electronic device for controlling the quantity of fuel injected in a fuel injection system of an internal combustion engine including means for generating a first series of voltage pulses in synchronism with the engine revolutions to provide a series of alternate highs and lows; means for generating a second series of voltage pulses at a frequency greatly in excess of the first series; means for counting a given number of the second series of voltage pulses from a given point in relation to the first series of voltage pulses; and means for producing a high output from said counting means after said count has been completed; means for detecting the presence of both a high level output from the first pulse generating means and the counting means in order to bring about said control of the quantity of fuel injected; and means for varying the count of the counting means in accordance with the speed and/or load conditions on the engine.

The electronic device thus controls the amount of fuel injected into a cylinder in a fuel injection system, the counting means starting to count from a position equivalent to the maximum quantity of fuel needed for any given running condition of the engine. In this case a low level output from the first trigger initiates the count of the counting means, said output then reverting to the high level a short time thereafter and before the count has been completed, so that when the count has been completed the presence of a second high output causes the solenoid of the fuel injection system to be operated.

The counting means is preferably a frequency divider.

Preferably, the means for varying the count of the frequency divider is a computer whose digital output is modified in accordance with digital information fed into it as regards the speed and/or load conditions on the engine.

The first and second series of generated pulses may be fast switched and current amplified by a trigger circuit comprising a plurality of cascaded transistors arranged to switch in inverse relation to one another so that at any one time at least one transistor is always fully saturated whilst its immediate neighbours are hard off.

The outputs from the first trigger and the counting means preferably operate a power transistor stage with one or more pre-amplifying stages to effect the injection of fuel by energizing the solenoid of the fuel injector.

The power transistor stage may consist of a darlington pair having a commoned collector electrode, a zener diode and series resistor being connected between the commoned collectors and the base electrode of the first transistor of the pair. The collector electrode of the last transistor of the trigger is preferably connected to the base electrode of the first transistor of the darlington pair by way of a diode and iron cored inductor connected in series, the function of the latter being to slow down the switching rate of the darlington pair.

BRIEF DESCRIPTION OF THE DRAWINGS

The present invention will now be described in greater detail by way of examples with reference to the accompanying drawings, wherein.

DESCRIPTION OF THE PREFERRED EMBODIMENT

The embodiment described with reference to the drawings is for a six cylinder internal combustion engine having two fuel injectors which operate alternately. There are thus two identical electronic systems $a$ and $b$ (except for the computer) only one such system being described in detail, it being appreciated that the second system is identical with the first in all respects, the second system $b$ being shown in block outline only in FIG. 1.

Figure 1:
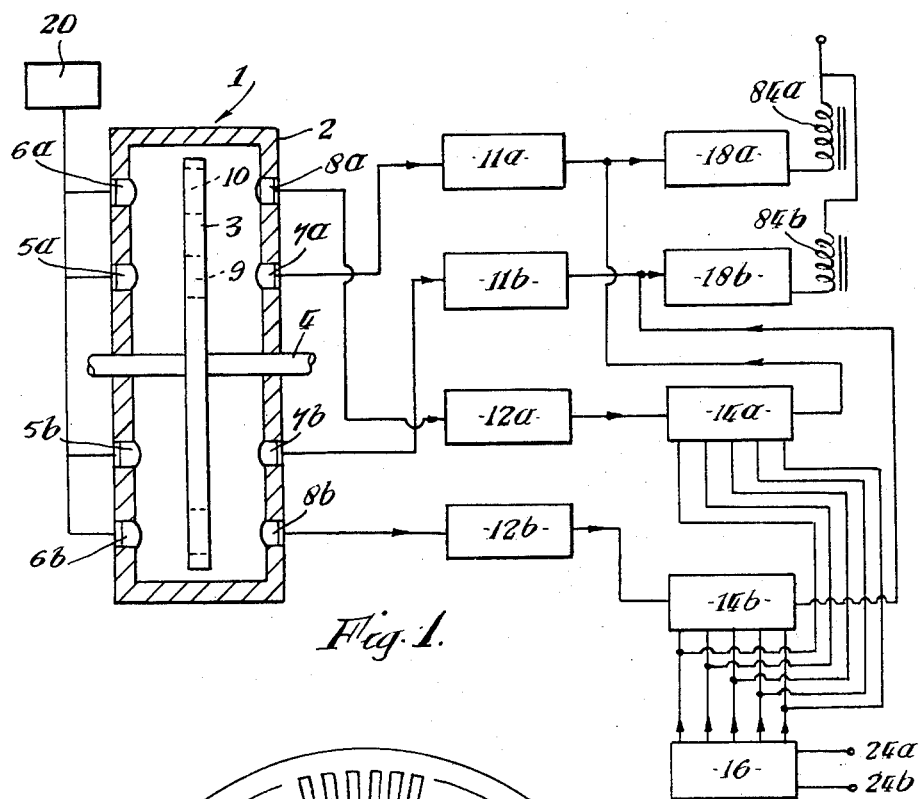
FIG. 1 is a diagram (partly in block form) of one form of device for determining the amount of fuel to be injected for use with a fuel injection system of an internal combustion engine.
Figure 2:
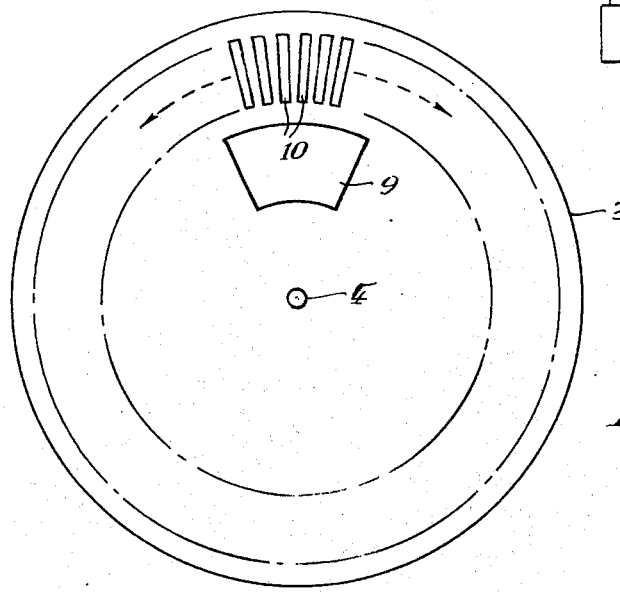
FIG. 2 is a front view of the disc shown in FIG. 1.
Figure 3:
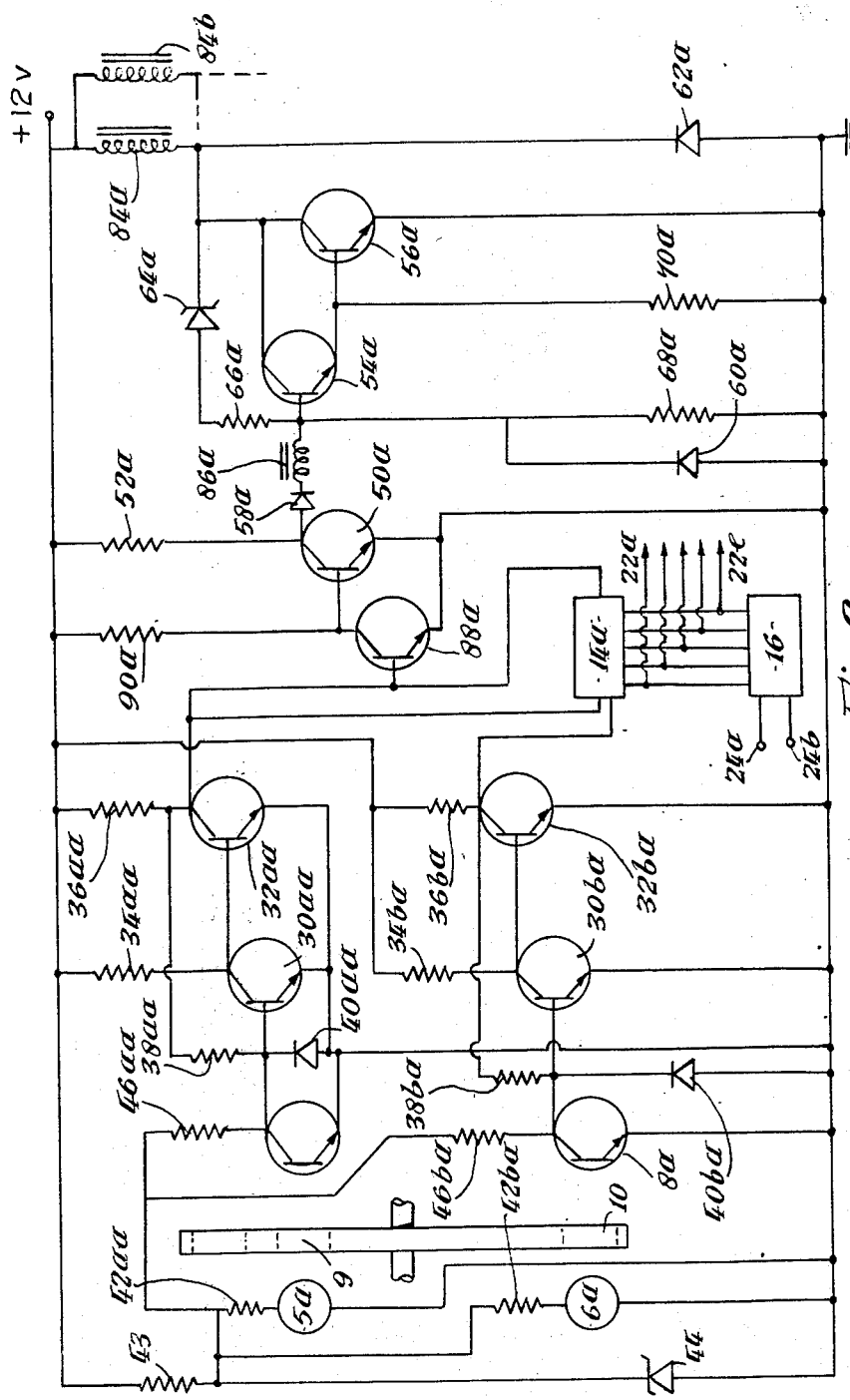
FIG. 3 is a detailed circuit diagram of the electronic device for determining the amount of fuel injection according to speed and/or load conditions at any given instant.

Referring to FIGS. 1 to 3, the device for achieving the electronic control of the quantity of fuel injected in a fuel injection system, includes a radiation chopper device generally designated 1; a first pair of fast inverse switching trigger circuits 11$a$ and 11$b$; a second pair of fast inverse switching trigger circuits 12$a$ and 12$b$; a pair of frequency dividers 14$a$ and 14$b$; a computer 16;

and a pair of amplifier and power transistor stages 18a and 18b.

The radiation chopper device 1 consists of a housing 2; a disc 3; a shaft 4 carrying the disc 3; two pairs of infra-red radiation sources 5a and 5b, and 6a and 6b; and two pairs of radiation detectors 7a and 7b, and 8a and 8b. The infra-red radiation sources 5a, 5b, 6a and 6b are preferably gallium arsenide lamps and the radiation detectors 7a, 7b, 8a and 8b are preferably photo-transistors, all these elements being fixed to the housing 2. The shaft 4 is journalled in bearings (not shown) in the housing 2 and is driven at cam shaft speed of the engine.

The chopper disc 3 comprises sixty four slits 10 arranged in equi-spaced relation around the disc and concentric to the shaft 4, and a single large aperture 9. The aperture 9 permits infra-red radiation for the lamp 5a or 5b to reach the respective photo-transistor 7a or 7b, and the slits 10 permit infra-red radiation from the lamps 6a and 6b to reach the respective photo-transistors 8a and 8b. The lamps 5a, 5b, 6a and 6b are energized through a common stabilized voltage source 20.

The output from the respective photo-transistors 7a, 7b, 8a and 8b is fed to the inputs of respective fast inverse switching triggers 11a, 11b, 12a and 12b. The output of the second pair of triggers 12a and 12b is fed to the respective frequency dividers 14a and 14b which normally gives a 0 output, but which on completion of the count down set into it from the computer 16 gives a 1 output. The count set into the frequency dividers 14a and 14b is controlled from the computer 16 by means of five output lines 22a to 22e, each of which is either at a high level of voltage to represent a 1 or at a low level of voltage to represent a 0 in accordance with the binary notation. The computer 16 receives at two inputs 24a and 24b information in digital form concerning the speed and load on the engine, this information being obtained from any known analogue type of measuring device and then converted into digital form so that the computer can calculate the count down necessary to achieve a correct quantity of fuel to be injected into a cylinder. In this example, the computer has a maximum count of 32. The amplifier and power transistor stages 18a and 18b control the current flow through the respective solenoids 84a and 84b. When the outputs from the respective stages 11a and 11b and 14a and 14b are either 0 and 1 or 1 and 0 or 0 and 0 no current flows through the respective solenoids 84a and 84b but when both outputs are at the high level 1, then current flows through the solenoids to cause energization thereof, and thus initiate the fuel injection.

Referring now to FIG. 3, the first and second triggers 11a and 12a respectively include first transistors 30aa and 30ba, second transistors 32aa and 32ba, first collector load resistors 34aa and 34ba, second collector load resistors 36aa and 36ba, and feedback resistors 38aa and 38ba. The first and second transistors of each trigger are connected in cascade to switch in inverse relation to one another, so that when one is fully saturated (ON) the other is fully non-conductive (OFF). Also the output from the photo-transistors 7a and 8a is connected to the base electrodes of the respective first transistors 30aa and 30ba such that when the photo-transistors conduct, the first transistors switch off and vice versa. Respective diodes 40aa and 40ba are connected across the collector-emitter electrodes of the photo-transistors 7a and 8a to ensure clean switching of these elements.

The gallium arsenide lamps 5a and 6a are connected in series with respective resistors 42aa and 42ba and connected in parallel with one another across the +12 volt battery supply through a resistor 43. A zener diode 44 is connected across all the paralleled gallium arsenide lamps 5a, 5b, 6a and 6b in order to provide a stabilized voltage. The voltage across all the photo-transistors 7a, 7b, 8a and 8b is also stabilized by means of the zener diode 44 the photo-transistors being connected in series with respective resistors 46aa, 46ab, 46ba and 46bb.

The output from the collector electrode of the transistor 32aa of the first trigger 11a is applied direct to the base electrode of an inverting transistor 88a positioned in front of the power stage 18a, and also to the set/reset input of the frequency divider 14a. The output from the collector electrode of the transistor 32ba of the second trigger 12a is applied indirectly to the base electrode of the transistor 88a through the frequency divider 14a. The transistor 88a will conduct only if the outputs from the stages 11a and 14a are at the high level representing a 1. This transistor is thus normally "off" under all the three conditions except the double high when it becomes fully saturated. A resistor 90a is provided in series with its collector electrode.

The power transistor stage 18a includes a transistor 50a; two power transistors 54a and 56a connected as a darlington pair; diodes 58a, 60a and 62a; a zener diode 64a; resistors 66a, 68a and 70a; and an iron cored inductance 86a. The power transistors 54a and 56a are fully protected by means of the zener diode 64a and the diode 62a. The zener diode is arranged to conduct above a certain voltage level so that if there are any positive going transients induced in the circuit when the darlington pair has switched off, these break down the zener diode 64a which conducts them through the resistor 66a to the base electrode of the power transistor 54a. The darlington pair is thus caused to turn on in a controlled manner for the duration of these transients so that there is no risk of either of the components of the darlington pair being broken down in the event of high positive going voltage surges. Negative going transients which occur when the darlington pair is switched off are conducted on earth via the diode 62a. The purpose of the diode 58a is to prevent the voltage passed by the zener diode 64a from flowing to earth via the transistor 50a.

The solenoid 84a is in series with the darlington pair output stage across the 12 volt supply, the solenoid being energized when the darlington pair is switched on.

The fuel injection system illustrated is for a six cylinder engine and as in the case of the system disclosed in patent applications Ser. Nos. 874,470 now U.S. Pat. No. 3,851,628 and Ser. No. 202,979, now U.S. Pat. No. 3,810,448 the two fuel injectors are each arranged to feed three cylinders, the first one feeding cylinders I, II and III and the second feeding cylinders IV, V and VI. The order of firing in a six cylinder engine is I-V-III-VI-II-IV so that the solenoids 84a and 84b have to operate alternately, this being achieved by the single aperture 9 in the disc 3 which alternately causes energization of the solenoids 84a and 84b through the two identical electronic systems a and b.

The aperture 9 is arranged such that a maximum quantity of fuel can be injected, if the solenoid is energized for substantially the whole of the arc subtended by the aperture 9. A reduced quantity of fuel is obtained by not energizing each solenoid until a predetermined count has been made so that a much narrower "window" of solenoid energization is obtained.

Figure 4:
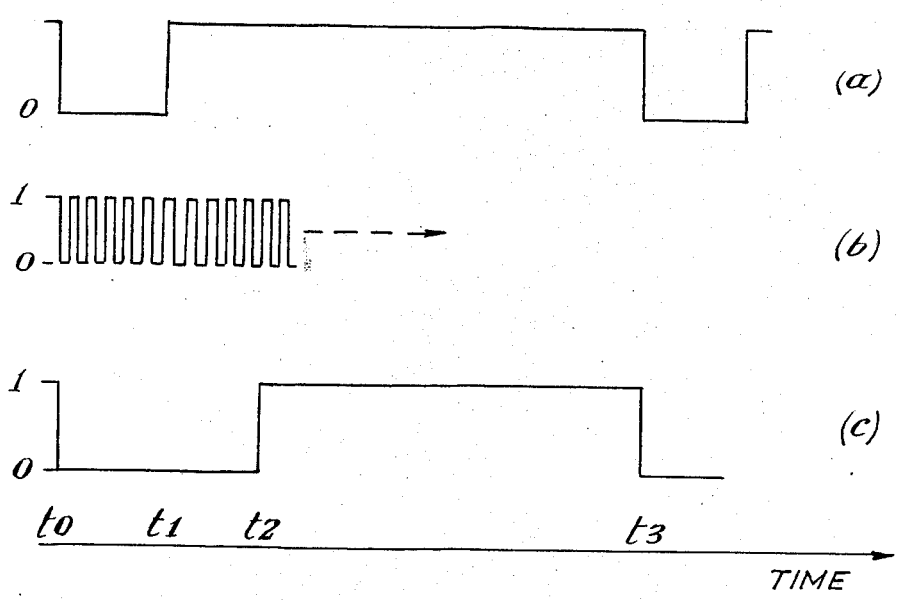
FIG. 4 is a set of waveforms which assist in explaining the operation of the circuit shown in FIG. 3.

The operation of the electronic device for controlling the amount of fuel injected will now be described in greater detail with the aid of the three waveforms shown in FIG. 4. The waveforms (a) and (b) represent the outputs from the first and second triggers 11a and 12a (considering only one half of the circuit for simplicity, the outputs for the second half being identical but shifted in phase by 180°).

At time t0, the photo-transistor 7a is energized by infra-red radiation and the output from the transistor 32aa drops to the low level. At the same time the output from the frequency divider 14a is returned to the low level and the count started. At time t1, the photo-transistor 7a is de-energized, and the output from the transistor 32aa returns to the high level. However, since the frequency divider 14a still has a low level output, the transistor 88a cannot be switched ON. In the example illustrated, the frequency divider 14a provides a high level output after a count of ten, which occurs at time t2. The transistor 88a switches on, the transistor 50a switches off and the power transistors 54a and 56a switch on to energize the solenoid 84a. The solenoid remians energized until the time t3 when the photo-transistor 7a is energized again and the outputs from the stages 11a and 14a fall to their low level. The computer is set such that the count must exceed six, because the solenoid cannot be operated unless there are two "highs" at the input to the transistor 88a, so that the range of fuel injection ranges from a maximum of 32−6 = 26 pulses down to a minimum of zero.

The above described device thus provides the electronic control of the quantity of fuel injected into a cylinder in a fuel injection system, the relevant control being calculated in accordance with the speed and/or load on the engine.

What I claim and desire to secure by Letters Patent is:

1. An electronic device for controlling the quantity of fuel injected in a fuel injection system of an internal combustion engine in accordance with engine requirements, including means for generating a first series of square-wave voltage pulses in synchronism with the engine revolutions to provide a series of alternate first and second voltage levels; means for generating a second sereies of square-wave voltage pulses also in synchronism with the engine revolutions and at a fixed multiple of the first series of square-wave voltage pulses, so that the frequency of the second series of voltage pulses is greatly in excess of the frequency of the first series of voltage pulses; means for counting a number of the second series of voltage pulses from a predetermined point in relation to the first series of voltage pulses, the numbeer of said pulses counted depending on the engine requirements; means for producing an output at the first voltage level from said counting means after said count has been completed; means for detecting the presence of both an output at the first voltage level from the first pulse generating means, and an output at the first level from the counting means, in order to inject a quantity of fuel dependent on the remainder of the count for which there is an output at the first level from the first series of voltage pulses; and means for continuously varying the count of the counting means in accordance with the requirements of the engine.

2. An electronic device according to claim 1, including: an opaque disc driven in synchronism with the engine; sixtyfour equi-spaced slits around the disc near the periphery thereof; a single aperture near the center of the disc; a pair of infra-red sources positioned on one side of the disc in line with the slits and aperture; a pair of infra-red detector positioned on the other side of the disc for generating said first and second square-wave voltage pulses as "highs" and "lows" representing the first and second voltage levels respectively, the count of the counting means commencing at the instant that the infra-red radiation is cut off from the first detector.

3. An electronic device according to claim 1, including at least one fuel injector and solenoid, wherein the counting means starts to count from a position equivalent to the maximum quantity of fuel needed for any given running condition of the engine, a low voltage level output from the first pulse generating means, representing said second voltage level, initiating the start of the count, said output then reverting to a high voltage level, representing said first voltage level, a short time thereafter, the counting means then counting down the predetermined number set therein before giving a high voltage level output, which together with the high voltage level output of the first pulse generating means, causes the energization of the solenoid associated with the fuel injector of the fuel injection system to deliver the desired quantity of fuel.

4. An electronic device according to claim 1, wherein the counting means is a frequency divider.

5. An electronic device according to claim 4, wherein the means for varying the count of the frequency divider is a computer whose digital output is modified in accordance with digital information fed into it as regards the speed and load conditions on the engine.

6. An electronic device according to claim 1, wherein the first and second series of generated pulses are each applied to respective trigger circuits, each trigger circuit comprising a plurality of cascaded transistors arranged to switch in inverse relation to one another so that at any one time one transistor is fully saturated whilst its immediate neighbors are hard off.

7. An electronic device according to claim 1, including a power transistor stage; a pre-amplifier stage; and an inverting stage in front of the preamplifier stage, the inverting stage being arranged to be turned on only in the presence of both a high voltage level pulse from the first pulse generating means and a high voltage level pulse from the counting means, the transistors of the pre-amplifying stage and the power transistor stage switching in inverse relation to their neighbors.

8. An electronic device according to claim 7, wherein the power transistor stage consists of a darlington pair having a commoned collector electrode, a zener diode and series resistor being connected between the commoned collectors and the base electrode of the first transistor of the pair, the collector electrode of the transistor of the pre-amplifier stage being connected to the base electrode of the first transistor of the darlington pair by way of a diode and iron cored inductor connected in series.

9. An electronic device for controlling the quantity of fuel injected in a fuel injection system of an internal combustion engine having six cylinders, by a pair of solenoid operated fuel injectors, the injectors operating alternately, and each being associated with three cylinders of the engine, said device including an opaque disc driven in synchronism with the engine; a series of equi-spaced slits around the disc; a single aperture in the disc; two pairs of infra-red radiation sources and two pairs of infra-red radiation detectors arranged on opposite sides of the disc, the first pair being arranged to cooperate with said aperture and second pair with the slits, the elements of each pair being displaced by 180° with respect to one another, the infra-red detectors of the first pair each generating a first series of square-wave voltage pulses in synchronism with the engine revolutions to provide a series of alternate first and second voltage levels; infra-red detectors of the second pair each generating a second series of square-wave voltage pulses also in synchronism with the engine revolutions, and at a fixed multiple of the first series of square-wave voltage pulses so that the frequency of the second series of voltage pulses is greatly in excess of the first series; a pair of frequency divider circuits for counting the pulses generated from the respective detectors of the second pair of infra-red detectors at a starting point determined when said respective first series of pulses change from the first to the second voltage level; a computer for receiving analog information on a pair of inputs regarding the fuel requirements of the engine, and for providing a corresponding digital output in accordance with said analog information to change the count of both frequency dividers, each frequency divider giving an output after the predetermined count, the first series of pulses having previously reverted to the first voltage level before completion of the count; a pair of transistorized power stages connected in series with respective solenoids, each power stage being rendered conductive at the instant when there is a first voltage level output from its associated frequency divider and its associated detector of the first pair, whereby the quantity of fuel injected by each fuel injector is precisely monitored in accordance with engine requirements.

10. An electronic device according to claim 9, wherein the disc is provided with 64 slits arranged concentric with the shaft thereof, near the outer periphery of the disc, the components of the first and second pairs of infra-red radiation sources and detectors being arranged such that one set associated with the first solenoid is diametrically opposite the second set associated with the second solenoid whereby the two solenoids are triggered alternately every rotation of the opaque disc.

11. An electronic device according to claim 9, wherein the computer has five outputs which are connected to five inputs of respective frequency divider circuits, the outputs from the computer representing either 1 to a 0 whereby a digital count of 32 can be fed into the respective frequency dividers in accordance with the binary notation, said computer being programmed such that the minimum count permitted is six so as to allow the first series of pulses time to revert to the first voltage level, the maximum count then effectively being twenty-six digits different from the minimum count, whereby the total range of fuel injection from maximum to minimum can be carried out in 26 steps.

* * * * *